United States Patent [19]

Jackson

[11] Patent Number: 5,424,950
[45] Date of Patent: Jun. 13, 1995

[54] VEHICLE CONTROL SURFACE POSITION FEEDBACK COMPENSATOR FOR REDUCING VEHICLE OSCILLATION

[75] Inventor: Joseph W. Jackson, Glendale, Ariz.

[73] Assignee: Honeywell Inc., Minneapolis, Minn.

[21] Appl. No.: 893,990

[22] Filed: Jun. 2, 1992

[51] Int. Cl.⁶ ............................................. G05B 5/01
[52] U.S. Cl. ................................ 364/434; 244/192; 318/611; 364/166
[58] Field of Search ............ 364/434, 571.01, 572, 364/148, 153, 155, 166, 177; 244/178, 192, 193; 318/611, 615, 618

[56] References Cited

U.S. PATENT DOCUMENTS

| | | | |
|---|---|---|---|
| 4,148,452 | 4/1979 | Niessen et al. | 244/195 |
| 4,573,125 | 2/1986 | Koenig | 364/434 |
| 4,797,829 | 1/1989 | Martorella et al. | 364/434 |
| 5,015,934 | 5/1991 | Holley et al. | 318/611 |

*Primary Examiner*—Michael Zanelli
*Attorney, Agent, or Firm*—S. Levine; B. C. Downs; R. E. Champion

[57] ABSTRACT

In a servo loop closure for an aircraft control surface, surface position from the control surface synchro is utilized to augment the servo motor rate feedback so as to reduce limit cycle oscillation. The high frequency content of surface position is suppressed by substituting a percentage of the low frequency content thereof for the same percentage of low frequency servo motor rate. This arrangement reduces control column activity normally associated with high effectiveness ratios of surface position for servo motor rate substitution.

13 Claims, 3 Drawing Sheets

VEHICLE CONTROL SURFACE POSITION FEEDBACK COMPENSATOR FOR REDUCING VEHICLE OSCILLATION

BACKGROUND OF THE INVENTION

1. Field of the Invention

The invention relates to aircraft automatic flight control systems, particularly with respect to reducing limit cycle oscillations induced in the systems by lost motion hysteresis and lag. The invention is applicable to automatic flight control systems for both commercial and military aircraft with respect to control about the pitch, roll and yaw axes. The invention is applicable to drum and cable as well as hydraulic control surface actuator servos.

2. Description of the Prior Art

Automatic flight control systems are known for positioning the aircraft control surfaces in accordance with a variety of control modes. Hysteresis and lag exist in numerous control channels. For example, in certain aircraft there is significant lost motion between the autopilot servo drum and the elevator surface. When the autopilot is engaged and, for example, the altitude control mode is selected, a slow oscillation may be generated because of the autopilot/hysteresis coupling. In other aircraft, hysteresis effects are exhibited in hydraulic control surface positioning systems and pitch and roll low frequency oscillations may be generated in such aircraft. Low frequency oscillations of the type described are often referred to as "limit cycles." It is appreciated that automatic flight control systems are prevalent with conditions under which limit cycle oscillations may occur. Such oscillations are created when a hysteresis block is embedded in a larger autopilot system where the oscillation criteria are satisfied. For convenience, the invention will be described in terms of the aircraft pitch axis.

In automatic flight control systems for modern jet transports, the servo loop that positions a control surface in response to a control surface position command, is often closed utilizing servo motor position and rate to provide desirable servo bandwidth and stability characteristics. In a particular jet transport, where the autopilot servo drum to elevator surface coupling exhibited significant hysteresis and lag, conventional means of obviating limit cycle oscillation were unsuccessful. The elevator surface position was utilized to compensate for the lost motion in the elevator circuit. In the prior art designs, the elevator surface position signal was substituted for an equal portion of the servo position feedback in the autopilot servo control law. This arrangement was effective to lower the limit cycle amplitudes proportional to the ratio of substitution utilized. In the particular application, a ratio of 80% or higher was required to control the aircraft limit cycle oscillations. The ratio, however, was practically limited to 30% because of the high level of control column activity caused by overcompensating the servo for control system hysteresis and lag.

SUMMARY OF THE INVENTION

The disadvantages of the prior art are obviated by apparatus for suppressing oscillatory motion of a vehicle having at least one control surface for controlling the vehicle attitude and an automatic control system for controlling the control surface. The control system includes a positioning servo loop having a servo actuator motor coupled to the control surface for positioning the control surface in response to a control surface position command. The positioning servo loop is closed by a feedback signal which is a combination of a first signal derived from the servo actuator motor and a second signal derived from the control surface. The apparatus comprises means for suppressing the low frequency content of the first signal below a predetermined frequency by a predetermined percentage and means for substituting the low frequency content of the second signal below the predetermined frequency to the predetermined percentage. The feedback signal is thus provided with a high frequency content derived from the first signal and a low frequency content derived from the second signal up to the predetermined percentage, the high and low frequency content of the feedback signal being above and below the predetermined frequency, respectively.

DESCRIPTION OF THE PREFERRED EMBODIMENTS

Figure 1:
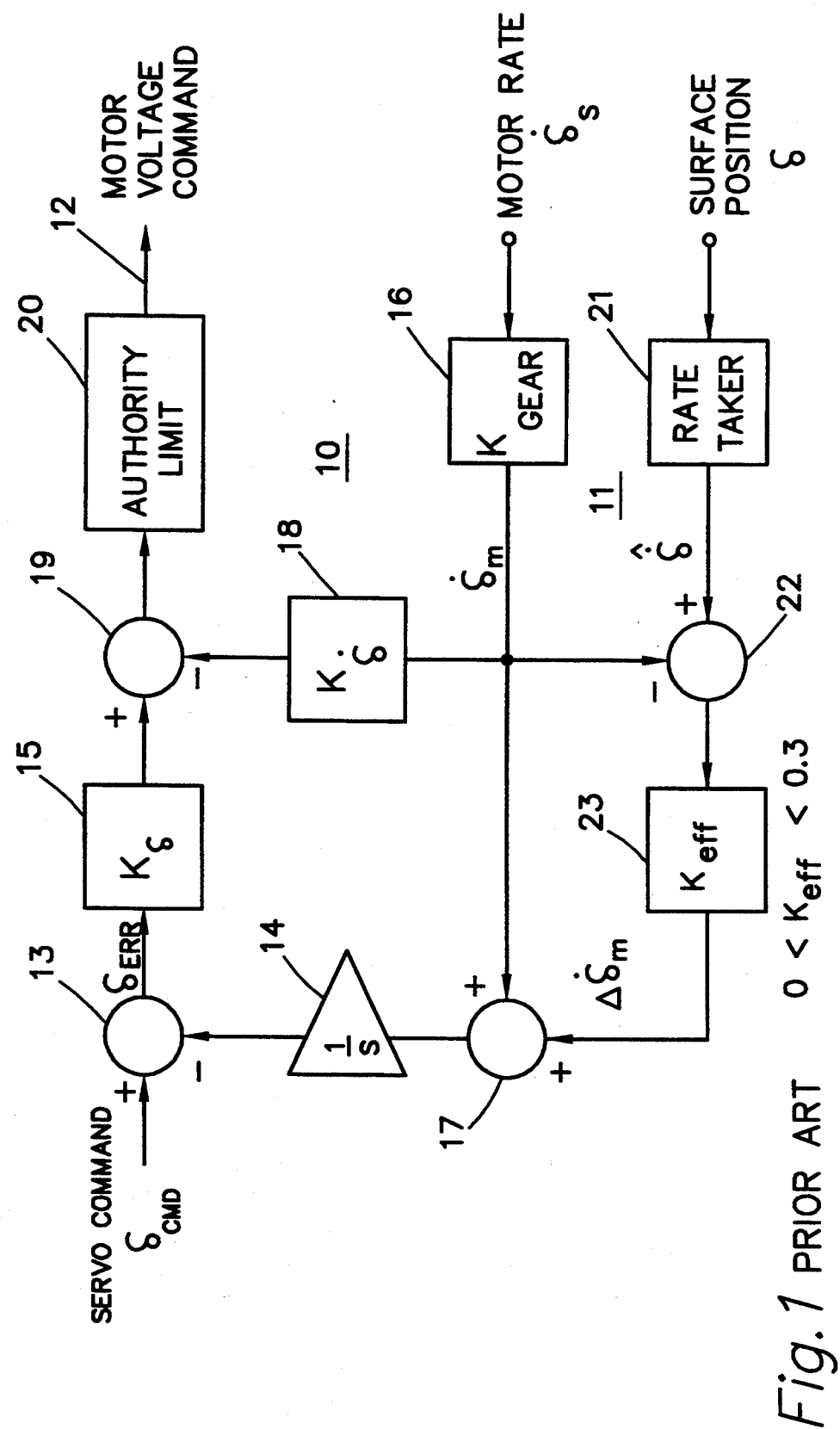
FIG. 1 is a schematic block diagram illustrating a portion of a control surface positioning servo loop with a conventional surface position feedback compensator.

Referring to FIG. 1, a conventional servo loop closure portion 10 of a conventional control surface positioning servo loop is illustrated. A prior art surface position feedback compensator 11 for reducing limit cycle oscillations is also illustrated. The servo loop of FIG. 1 is exemplified as an electro-mechanical type providing a servo motor voltage command at an output 12. The servo positioning command, $\delta_{cmd}$, is applied to a subtracting function 13 to generate the servo position error, $\delta_{err}$, by subtracting the output of the servo loop position integrator 14 from the servo command. The servo position error from the subtracting function 13 is amplified by the gain $K_\delta$ in a gain function 15. Servo motor rate feedback, $\delta_s$, is amplified by the gain $K_{gear}$ in a gain function 16 and applied through a summing function 17 as the input to the position integrator 14. The motor rate signal is obtained from a tachometer connected to the servo motor. The $K_{gear}$ gain accounts for the gearing between the servo motor shaft and the control surface (surface position).

The motor rate through $K_{gear}$ 16, denoted as $\delta_m$, is amplified by the gain $K_\delta$ in a gain function 18. The gain multiplied motor rate is subtracted from the gain multiplied servo position error in a subtracting function 19 to determine the servo motor voltage command 12. The servo motor voltage command from the subtracting function 19 passes through an authority limit 20 to determine the actual voltage applied to the servo motor.

Position feedback for the servo loop is provided by integrated motor rate via the position integrator 14 and rate feedback for the loop is provided by gain amplified motor rate at the subtracting function 19. The position error from the subtracting function 13 is determined solely by integrated motor rate if $K_{eff}=0$.

As discussed above, control system hysteresis and lag between the servo and surface may result in limit cycle oscillations. The prior art introduced surface position feedback compensation exemplified as the surface position feedback compensator 11. Surface position, $\delta$, is passed through a rate taker 21 to provide an estimate of elevator surface rate, $\dot{\delta}$. Surface position, $\delta$, is obtained, for example, from the elevator surface position synchro. Motor rate through the gain function 16 is subtracted from surface position rate in a subtracting function 22. The error term between servo motor rate and surface position rate from the subtracting function 22 is applied through a $K_{eff}$ effectiveness block 23 to augment the servo feedback at the summing function 17. The output of $K_{eff}$ 23 is denoted as $\Delta\dot{\delta}_m$.

Thus it is appreciated that the compensator 11 subtracts $K_{eff}$ times the motor rate from the motor rate component of the servo feedback signal and substitutes $K_{eff}$ times the surface rate therefor, thereby maintaining unity feedback through integrator 14. In other words, the elevator surface position is substituted for an equal portion of the servo position feedback in the autopilot servo control law.

As discussed above, the arrangement of FIG. 1 is effective at lowering the limit cycle oscillations proportional to the ratio of substitution utilized. This ratio is, however, practically limited to 30% because of the high level of control column activity caused by overcompensating the servo for control system hysteresis and lag. In certain aircraft, a ratio of 80% or higher is required to control the limit cycle oscillations.

With continued reference to FIG. 1, the servo control conventionally utilizes motor rate and position to satisfy the servo position command. The prior art compensator 11 augments the position feedback by substituting sensed surface position for servo position, while maintaining unity feedback. The effectiveness gain $K_{eff}$ 23 determines the ratio of surface-to-servo position used in the servo control. The compensator 11 utilizes the algebraic difference between servo and surface position derived from the subtracting function 22 to augment the position feedback signal in the servo control. Lag or hysteresis between the servo and surface results in an error signal generated in the subtracting function 22. Increasing $K_{eff}$ from zero causes the servo motor to respond to servo-to-surface position errors for all frequencies. Thus, if error persists due to lag or hysteresis between the servo and surface, the servo will "overcompensate" (i.e., move further than with zero $K_{eff}$) to cause surface position to reflect the servo position command. To a closed loop system in which the servo control of FIG. 1 is embedded, this "overcompensation" artificially reduces the control system lag and hysteresis between the servo and surface, resulting in smaller limit cycle amplitudes.

The servo-to-surface position errors at all frequencies is compensated by the servo control action. Since the control system hysteresis is usually associated with a control system lag, the surface position signal has significantly less high frequency content than the servo position signal (relative to the servo bandwidth). Thus, the servo control with the position error amplifies this high frequency difference, such that the servo moves much more than necessary in this frequency range. Since the servo is usually connected semi-rigidly to the pilot's control column, this high frequency "overcompensation" is sensed at the column. Especially in turbulent atmospheric conditions, this activity or "nervousness" of the control column has been a limiting factor in how much compensation could be utilized in prior art designs for limit cycle reduction. In some applications, the trade-off between control column activity and limit cycle reduction is unacceptable.

Since the control column activity that results from a high effectiveness ratio in the prior art design of FIG. 1 is primarily caused by the use of surface position synchro feedback for frequencies above 1 Hz, the present invention attenuates the synchro signal above approximately 1 Hz, while substituting servo rate to supplement the deficiency so as to maintain unity feedback. Thus, the present invention permits significantly higher effectiveness ratios for the surface position feedback compensator than in prior art designs.

The compensator of the present invention alleviates hysteresis-induced limit cycles in automatic flight control systems in applications where the prior approach could not be utilized. For certain aircraft applications, the amplitude improvement in limit cycle reduction is 6 to 1 utilizing the present invention compared to the prior art approach.

Generally, the prior art designs utilizing surface position derived from the control surface synchro to minimize the oscillation, had a limited effectiveness of approximately 30% because of control column activity. The present invention provides compensator effectiveness approaching unity without undesirable column activity.

Figure 2:
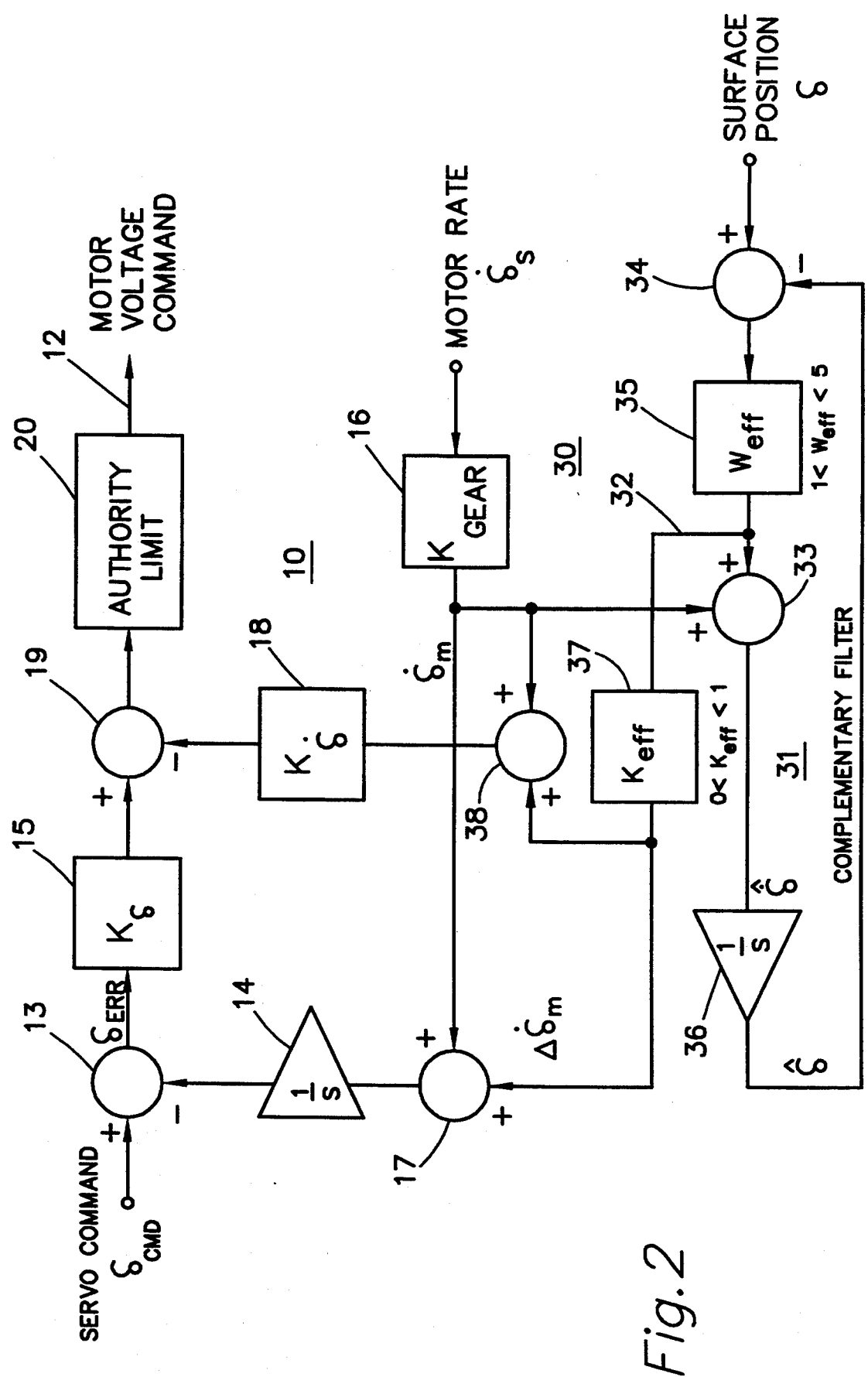
FIG. 2 is a schematic block diagram illustrating a portion of a control surface positioning servo loop having a surface position feedback compensator in accordance with the present invention.

Referring to FIG. 2, in which like reference numerals indicate like components with respect to FIG. 1, the servo loop closure 10 with a surface position feedback compensator 30, implemented in accordance with the invention, is illustrated. The compensator 30 basically comprises a complementary filter 31 responsive to surface position, $\delta$, and motor rate, $\dot{\delta}_m$, to provide a delta rate error term on a lead 32. The complementary filter 31 receives the motor rate signal through the gain $K_{gear}$ 16 at a summing function 33. The surface position signal is applied to the complementary filter 31 at a subtracting function 34. The output of the subtracting function 34 is applied through a low pass filter $W_{eff}$ 35 having a cutoff frequency that establishes the cutoff frequency for the complementary filter 31. As indicated by the legend, $W_{eff}$ 35 is set between 1 and 5 radians per second.

The output of $W_{eff}$ 35 provides an input to the summing function 33 and also provides the delta rate error term output of the complementary filter 31 on the lead 32. The output of the summing function 33, denoted as $\dot{\delta}$, is applied as an input to an integrator 36. The term $\dot{\delta}$ represents estimated surface rate. The output of the integrator 36, denoted as $\hat{\delta}$, is applied subtractively to the subtracting function 34. The term $\hat{\delta}$ provides an estimate of surface position having desirable characteristics, in a manner to be described.

The output of the complementary filter 31, on the lead 32, is applied through an effectiveness gain function $K_{eff}$ 37 to provide the compensator position feedback augmentation signal to the position integrator 14 through the summing function 17. The output of $K_{eff}$ 37 is denoted as $\Delta\dot{\delta}_m$. The output of $K_{eff}$ 37 is also combined with the motor rate output of the $K_{gear}$ function 16 in a summing function 38 to provide the servo loop closure rate term through the gain function 18. The output of $K_{eff}$ 37 into the summing function 38 is utilized to balance motor rate.

The complementary filter 31 uses surface position and motor rate to provide an estimate of surface position with the following design criteria: (1) the low frequency content of the estimate should be equal to that of surface position, and (2) the high frequency content of the estimate should be equal to that of integrated motor rate. The rationale for the first criterion is that if estimated surface position is utilized as the only servo closure position feedback (i.e., $K_{eff}=1$), the servo motor would be driven such that actual surface position is equal to the commanded servo position at low frequencies where the "outer" loops closed around the servo control require an accurate and timely response. The first criterion thus maximizes the reduction in control system hysteresis and lag effects on these "outer" loops. The estimate should be equal to actual surface position up to frequencies at least twice that of the limit cycles created by the hysteresis and the "outer" loops around the servo closure. The first criterion determines the minimum value for $W_{eff}$.

The second design criterion addresses the dynamics of the servo loop. Without surface position feedback ($K_{eff}=0$), the servo closure on motor rate and position exhibits known desirable closed loop dynamic characteristics related to bandwidth and stability. These dynamic characteristics are normally defined at much higher frequencies than those at which the limit cycle oscillations occur. Utilizing motor position (i.e., integrated motor rate) as the high frequency content of the estimated surface position, permits the servo dynamic characteristics to remain unaffected by the introduction of surface position feedback (i.e., $K_{eff}$ not equal to 0), thus separating servo dynamics from limit cycle compensation. These effects occur if $W_{eff}$, the estimator low/high frequency parameter, is significantly less than the closed loop servo bandwidth, 6:1 being typical. This criterion determines the maximum value for $W_{eff}$.

The delta rate error term developed in the complementary filter 31, is applied to the $K_{eff}$ gain function 37. The delta rate error term is zero if there is no lag or hysteresis between the servo and surface, and if $K_{gear}$ accurately represents the gain between these elements. If any lag, hysteresis or gain differential ($K_{gear}$ in error) exists between the servo and surface, the delta rate error will be non-zero, and will be composed of the low frequency error between surface position and integrated servo motor rate. The cutoff frequency is set by the value of $W_{eff}$.

The delta rate error developed in the complementary filter 31 is applied through the effectiveness gain $K_{eff}$ 37 to both the position path (position integrator 14) and rate path (gain function 18) of the servo closure 10. Because of the low frequency characteristic of this signal, the primary effective path of the compensator 30 is the position path. The rate path provides secondary effects in obtaining better response to servo commands when control system hysteresis or lag is present.

Figure 3:
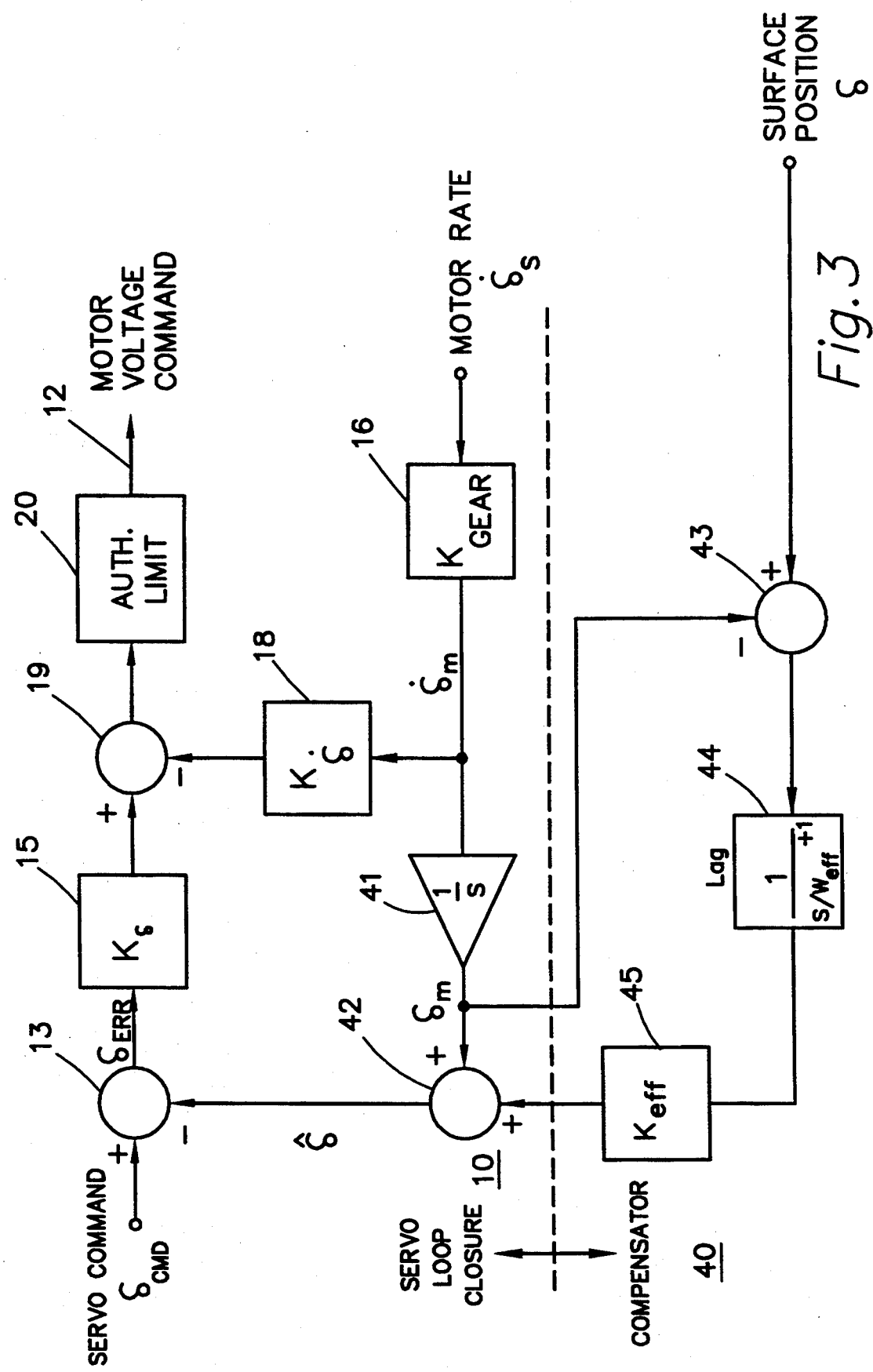
FIG. 3 is a schematic block diagram illustrating a portion of a control surface positioning servo loop having an alternative surface position feedback compensator in accordance with the present invention.

The complementary filter relationship between surface position and estimated surface position is that of a first order lag with cutoff frequency of $W_{eff}$. For $W_{eff}$ between 1 and 5 radians per second, a 1 Hz surface position signal would be attenuated accordingly. FIG. 3 illustrates an alternative embodiment utilizing a first order lag function.

Referring to FIG. 3, in which like reference numerals indicate like components with respect to FIGS. 1 and 2, the servo loop closure 10 is again illustrated but with a surface position feedback compensator 40. The motor rate through $K_{gear}$ 16 and a position integrator 41 provides servo loop closure motor position feedback, denoted as $\delta_m$, through a summing function 42. The summing function 42 receives the output of the compensator 40 to provide estimated surface position feedback, $\delta$, to the subtracting function 13.

The compensator 40 is comprised of a subtracting function 43, a first order lag function 44 and an effectiveness gain $K_{eff}$ 45. The transfer function of the lag 44 is: $1/[(S/W_{eff})+1]$. The subtracting function 43 provides a position error between servo motor and control surface and the error is passed through the first order lag 44 with cutoff frequency $W_{eff}$. The output of the lag function 44 is transmitted through the effectiveness gain $K_{eff}$ 45 to augment the standard motor position feedback.

It is readily apparent from FIG. 3, that the surface position feedback compensator 40 subtracts the servo motor position low frequency content (i.e., lagged motor position) through the $K_{eff}$ gain 45, and substitutes therefor the low frequency content of surface position. Thus, $W_{eff}$ controls the frequency and $K_{eff}$ controls the effectiveness of the compensation.

FIG. 3 is functionally identical to FIG. 2, except that the summing function 38 and the input thereto from $K_{eff}$ 37 has been deleted. This arrangement can also be utilized in the embodiment of FIG. 3 to balance motor rate.

Although the invention was described in terms of application to aircraft, it is appreciated that the invention is also applicable to other types of vehicles such as marine vessels, including submarines.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. Apparatus for suppressing oscillatory motion of a vehicle having at least one control surface for controlling vehicle attitude and an automatic control system for controlling said control surface, said control system including a positioning servo loop having a servo actuator motor coupled to said control surface for positioning said control surface in response to a control surface position command, said positioning servo loop being closed by a feedback signal, said feedback signal being a combination of a first signal derived from said servo actuator motor and a second signal derived from said control surface, said first signal having a frequency band below a predetermined frequency (first low frequency band $\Delta f_{L1}$) and a high frequency band above said predetermined frequency (first high frequency band $\Delta f_{H1}$), said second signal having a frequency band below said predetermined frequency (second low frequency band $\Delta f_{L2}$) and a frequency band above said predetermined frequency (second high frequency band $\Delta f_{H2}$), said apparatus comprising means for suppressing said first low frequency band by a predetermined percentage, and means for substituting, in said first signal, said predetermined percentage of said second low frequency band for said suppressed predetermined percentage of said first low frequency band, thereby providing said feedback signal with a high frequency band above said predetermined frequency that is equal to said first high frequency band and a low frequency band below said predetermined frequency that is equal to said predetermined precentage of said second low frequency band.

2. The apparatus of claim 1 wherein said vehicle comprises an aircraft and said automatic control system comprises an automatic flight control system.

3. The apparatus of claim 2 wherein said oscillatory motion comprises limit cycle oscillations and said predetermined frequency comprises a frequency greater than that of said limit cycle oscillations but substantially less than the high frequency band edge of the bandwidth of said positioning servo loop.

4. Apparatus for suppressing oscillatory motion of a vehicle having at least one control surface for controlling vehicle attitude and an automatic control system for controlling said control surface, said control system including a positioning servo loop having a servo actuator motor coupled to said control surface for positioning said control surface in response to a control surface position command, said positioning servo loop being closed by a feedback signal, said feedback signal being a combination of a first signal derived from said servo actuator motor and a second signal derived from said control surface, said apparatus comprising
means responsive to said first and second signals for obtaining a difference signal representative of position error between said servo actuator motor and said control surface,
means responsive to said difference signal for suppressing the high frequency content thereof above a predetermined frequency, thereby providing a low frequency difference signal, and
means for obtaining a predetermined percentage of said low frequency difference signal,
means for combining said first signal with said low frequency difference signal so as to provide said feedback signal, thereby with a high frequency content, above said predetermined frequency, derived from said first signal and a low frequency content, below said predetermined frequency, derived from said predetermined percentage of said second signal and said first signal less said predetermined percentage of said first signal.

5. The apparatus of claim 4 wherein said means responsive to said first and second signals and said means responsive to said difference signal comprises complementary filter means.

6. The apparatus of claim 5 further including effectiveness gain means coupling said low frequency difference signal to said means for combining for transmitting said low frequency difference signal in accordance with said predetermined percentage.

7. The apparatus of claim 5 wherein
said first signal comprises a servo motor rate signal proportional to the rate of said servo actuator motor,
said second signal comprises a control surface position signal proportional to the position of said control surface, and
said complementary filter means further includes integrator means responsive to said servo motor rate signal for providing an integrated motor rate signal.

8. The apparatus of claim 7 wherein said means responsive to said first and second signals comprises subtracting means for subtracting said integrated motor rate signal from said control surface position signal to provide said difference signal.

9. The apparatus of claim 8 wherein said means responsive to said difference signal comprises low pass filter means having a cutoff frequency equal to said predetermined frequency.

10. The apparatus of claim 4 wherein said means responsive to said difference signal comprises first order lag means with a cutoff frequency equal to said predetermined frequency.

11. The apparatus of claim 10 further including effectiveness gain means coupling said low frequency difference signal from said first order lag means to said means for combining for transmitting said low frequency difference signal in accordance with said predetermined percentage.

12. The apparatus of claim 10 wherein
said first signal comprises a servo motor rate signal proportional to the rate of said servo actuator motor,
said second signal comprises a control surface position signal proportional to the position of said control surface, and
said positioning servo loop further includes integrator means responsive to said servo motor rate signal for providing an integrated motor rate signal.

13. The apparatus of claim 12 wherein said means responsive to said first and second signals comprises subtracting means for subtracting said integrated motor rate signal from said control surface position signal to provide said difference signal.

* * * * *